United States Patent [19]

Schermutzki

[11] Patent Number: 4,793,787
[45] Date of Patent: Dec. 27, 1988

[54] APPARATUS FOR THE PRODUCTION OF MAT WEBS FROM A MIXTURE OF GRANULES

[75] Inventor: Konrad Schermutzki, Remseck, Fed. Rep. of Germany

[73] Assignee: Santrade Ltd., Lucerne, Switzerland

[21] Appl. No.: 146,602

[22] Filed: Jan. 21, 1988

[30] Foreign Application Priority Data

Jan. 30, 1987 [DE] Fed. Rep. of Germany ....... 3702753

[51] Int. Cl.$^4$ .............................................. B28B 17/00
[52] U.S. Cl. .................................. 425/140; 425/367; 425/373
[58] Field of Search ............... 425/140, 328, 363, 373, 425/367, 456, 421; 264/70, 109, 123; 222/196, 199

[56] References Cited

U.S. PATENT DOCUMENTS 2,069,589  2/1937  Meijling et al. ..................... 425/371

Primary Examiner—Bernard Nozick
Attorney, Agent, or Firm—Burns, Doane, Swecker & Mathis

[57] ABSTRACT

A layer of granules is deposited onto a conveyor belt and then heated and pressed to form a final product (e.g., floor covering). The layer is deposited from a funnel having a bottom outlet. Disposed across the outlet are a rotary sizing roll which forms a first gap with the belt, and an inclined guide plate which forms a second gap with the sizing roll. Granules flow through the second and first gaps, and then onto the belt. The second gap is larger than the first gap so that excess granules are supplied to the first gap, thereby assuring that no voids are created in the deposited layer. The guide plate is oscillated to facilitate a back-flow of excess granules to resist the possibility of excess granules being forced through by the sizing roll.

23 Claims, 3 Drawing Sheets

APPARATUS FOR THE PRODUCTION OF MAT WEBS FROM A MIXTURE OF GRANULES

BACKGROUND OF THE INVENTION

The invention concerns an apparatus for the production of mat-like webs from a mixture of granules, in particular, for the manufacture of floor coverings such as a PVC covering.

The apparatus comprises a conveyor belt and a feeder device including a funnel for feeding the mixture of granules. A sizing roll is located adjacent to the outlet of the funnel. The layer of granules deposited on the conveyor belt is then processed into the end product under the effect of pressure and temperature.

An apparatus of this type is known (e.g., see U.S. Pat. No. 2,069,589). In this known apparatus two endless belts are provided, the belts being conducted in a meandering fashion around heating and pressure rolls and receiving between them a layer of granules deposited from a funnel. The floor covering, to be prepared in the form of a web, is made from vulcanizable rubber granules. In order to control the thickness of the layer of rubber granules, a sizing roll is provided adjacent the funnel outlet, along which the granules are passing. A disadvantage may result if the sizing roll has a large diameter, because the rubber granules may be deformed thereunder, especially if a thin layer is being produced. One cause of this problem is that two granules are drawn in while located on top of each other and are thereby deformed. This results in an uneven profile of the end product, particularly when granules of different colors are being fed.

On the other hand, if the sizing roll has a diameter that is too small, the granules are not drawn in uniformly, because due to blocking and bridging, a dam is formed in front of the sizing roll, leading to local voids in the covering. In this case an uneven profile is again created in the product.

It is an object of the invention to design an apparatus of the afore-mentioned type such that the deposited granules form a continuous, uniform layer, without the risk of the local squeezing of granules.

SUMMARY OF THE INVENTION

To attain this object, the invention involves a sizing roll in the form of a draw-in roll located under the funnel and beneath part of the vertical projection of the funnel outlet. The surface of the draw-in roll is roughened. Disposed beneath the remaining part of the outlet is a guide device, which is oscillating transversely to the direction of transport and is equipped with a guide plate. The free ends of the guide plate extend below the draw-in roll. A first gap is formed between the belt and the draw-in roll, and a second gap is formed between the draw-in roll and the free end of the guide plate. Some of the granules coming through the outlet opening of the funnel are drawn-in by the rotating draw-in roll and transported to the first gap. The smooth, oscillating guide plate makes it possible for superfluous granules to easily flow back obliquely upwards. Consequently, there is always an adequate supply of granules present at the first gap to form an uninterrupted layer, but any superfluous granules can be easily conducted away due to the oscillating nature of the guide plate. On the way to the first gap, in the apparatus according to the invention, the excess granules fill any potential voids, as a certain damming tends to be created by the inclined guide plate. The guide plate performs oscillating movements under load in the direction of the axle of the draw-in roll, but without the draw-in roll or the feeder funnel also oscillating. The characteristics according to the invention lead to a dense, continuous and uniform layer, in which no local deformation of the granules is possible. If this uniform layer is subsequently exposed to pressure 15 and heat, for example in a dual belt press, a satisfactory end product is obtained, in which there are no uneven profiles and wherein a clear image of the preferable colored granular structure is preserved.

Preferably, the guide plate angle and surface characteristics are such that the granules may not flow solely by the influence of gravity, i.e., uncontrolled as a function of the fill height in the funnel, but rather are always transported to the conveyor belt in a controlled manner and as a function of variable parameters.

The oscillating guide device is designed to be stable, even if for example, a large width of the belt is to be supplied with granules. The apparatus is still simple.

The guide plate can be moved toward and away from the draw-in roll, and/or the shape of the guide plate can be altered. Hence, the free edge of the guide plate can be adapted to the draw-in gap.

The first gap can be altered in size to make possible an adaptation of the cross-section across the width of the first gap, so that the final layer thickness obtained is as uniform as possible.

Its possible thereby to vary the height of the gap in a direction transversely to the conveyor belt travel direction.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF PREFERRED EMBODIMENTS OF THE INVENTION

Figure 1:
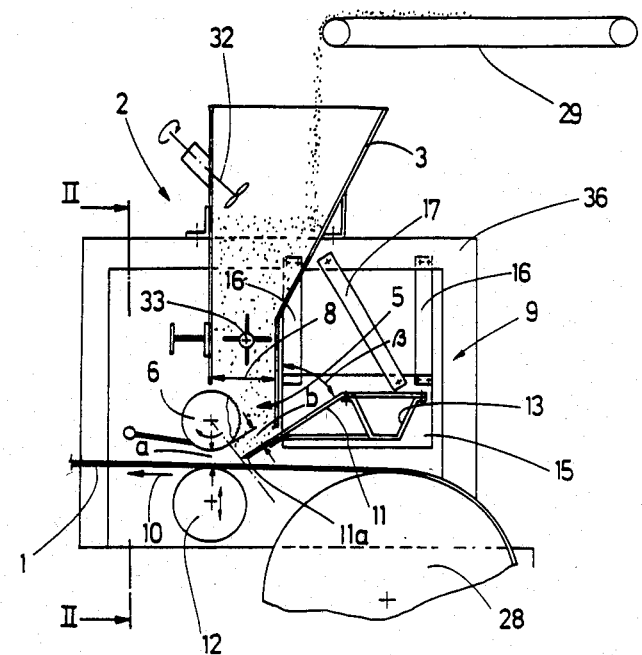
FIG. 1 is a schematic longitudinal section through a feeder device according to the invention.
Figure 2:
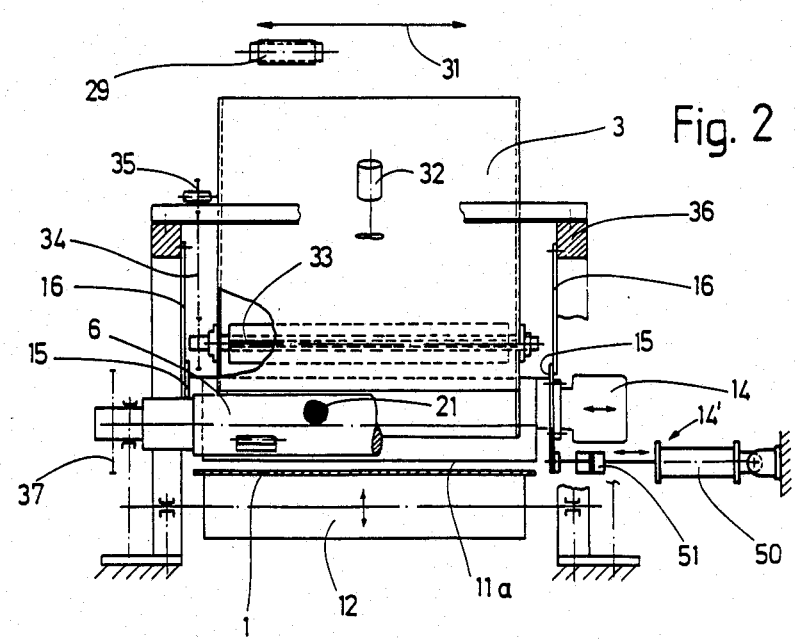
FIG. 2 is a schematic cross-section through the apparatus of FIG. 1 taken along the line 11—11.

FIGS. 1 and 2 depict a part of an endless revolving conveyor belt 1, which in this embodiment is a smooth steel belt, conducted around a reversing roll 28 to a second reversing roll (not shown). This steel belt 1 may, for example, comprise the lower belt of a dual belt press known per se, the upper belt of which is not shown. The conveyor belt 1 is associated with a feeder device 2 for a mixture 4 of granules, which mixture is transported by a revolving feeder belt 29 to a funnel shaped bin 3. The feeder belt 29 as shown in FIG. 2, oscillates laterally such that it traverses the entire width of the funnel 3 alternatingly in the direction of the arrow 31. Hence, the mixture 4 of granules drops into the funnel 3 in a uniform distribution over the entire funnel width. The conveyor belt 1 is conducted under the funnel 3 in the direction 10. The funnel 3 must therefore have a width roughly corresponding to the width of the conveyor belt 1. This width may amount to 2 mm or more in the preferred embodiment.

In the upper area of the funnel is provided a mixer blade 32 of a fill stand indicator. At the downwardly facing outlet opening of the funnel 5, a shaft 33 is situated which extends transversely to the conveying direction 10 and is equipped with an agitator blade. The shaft basically supports the weight of the mass of granules located above it. The agitator shaft 33 is driven by a pinion 35 by means of a chain or belt drive 34. The granules pass through the agitator and into the zone under the outlet opening 5 of the funnel 3. In that zone a draw-in roll 6 is mounted to rotate about an axis disposed transversely to the direction of travel of the conveyor belt 1. The roll is disposed under a front portion of the outlet opening 5, i.e., below a portion of a horizontal discharge width 8 of the funnel. At a rear side of the outlet opening 5, a vertical funnel wall extends toward the conveyor belt 1 and terminates at a top side of a feeder plate 11, which is inclined at an angle to the vertical. That angle is smaller than the particular angle of repose peculiar to the granules being fed. The feeder plate is disposed below that part of the outlet 5 not occupied by the roll 6. The feeder plate 11 is part of a guide device 9, which comprises a frame 13 extending transversely to the direction of travel 10 of the conveyor belt 1. The frame is closed at its end by side walls 15. The side walls 15 are supported by means of two cantilever-type plate springs 16 each mounted on a stationary framework 36. An oscillator 14 is connected to one of the side walls 15, in order to vibrate the frame 13 and the feeder plate 11 transversely to the direction 10 of transport. The oscillator 14 produces vibrations with a relatively low amplitude (for example 0.1 to 3 mm), but with a high frequency (for example 1000 to 10,000 Hz), upon which a high amplitude vibration (for example 3 to 20 mm) and of a low frequency (for example 1 to 10 Hz) is superposed; the latter vibration being produced by a second oscillator device 14' connected to the plate 15. This second oscillator 14' comprises a pneumatically controlled cylinder 50, which is connected to the plate 11 via damper 51.

A further plate spring 17 is arranged diagonally on the side walls 15 to rigidify the guide device 9 against vibration in the vertical direction by preventing the tilting of the guide apparatus. The plate springs 16 and the plate spring 17 are arranged, as seen in FIGS. 1 and 2, so that their planes are disposed parallel to the conveying direction 10.

The free edge 11a of the guide plate 11 projects into a gap a between the conveyor belt 1 and the draw-in roll 6 and may extend beneath the draw-in roll as viewed from above. The free edge 11a forms a gap b with the draw-in roll 6. An adjusting roll 12 is provided under the conveyor belt 1 and is associated with the draw-in roll 6, the adjusting roll being adjustable in the vertical direction. By means of the adjusting roll the size of the gap a may be adjusted. The gap a is chosen so that it is always slightly smaller than the size of the gap b.

The surface of the draw-in roll 6 is roughened. In the preferred embodiment, the draw-in roll 6 is in the form of a knurled roll with a knurling 21 extending parallel to the axle of the draw-in roll 6 The draw-in roll 6 is driven by means of a schematically indicated tooth gear 37. The driving velocity of the draw-in roll 6 is adjusted to the conveying velocity of the steel belt. The draw-in roll 6 is for this purpose connected with the drive of the conveyor belt 1 by means of a gear, or is equipped with its own variable drive.

During operation, the mixture 4 of granules is seized by the rotating surface of the draw-in roll 6 in the area of the funnel outlet opening 5 and drawn into the space between the roll 6 and the plate 11 whereupon they are fed to the gap b and later into the gap a. This results in a forced guidance of the grains of the mixture 4, which are drawn into the gap between the rough surface of the draw-in roll 6 and the smooth surface of the steel belt and the smooth oscillating guide plate 11. The draw-in roll 6 runs essentially at a circumferential velocity corresponding to the conveying velocity of the steel belt 1. By means of this arrangement, the granule particles are supplied in excess to the gap a between the draw-in roll 6 and the belt 1. The oscillating guide plate 11 facilitates a back-flow of the excess granules in an obliquely upward direction. The granules therefore form a continuous layer on the belt 1, as they are always present in excess in front of the gap a. In view of the possibility of the back-flow along the oblique wall of the guide plate 11, there is less risk that the granules will be forcefully squeezed into the gap between the conveyor belt 1 and the draw-in roll 6 under the draw-in effect of the draw-in roll 6. It was determined that by means of the present invention a uniform unwarped layer of the granule mixture may be formed on the conveyor belt 1. This layer, after its entry into the dual belt press, results in an end product in which the structure of the granules is clearly visible. There is no warping in the direction of flow.

Figure 3:
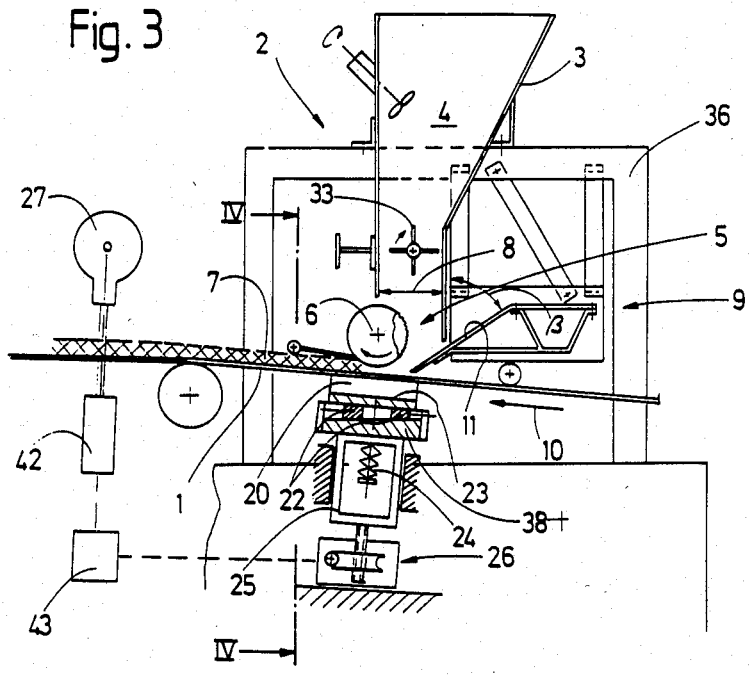
FIG. 3 is a longitudinal section similar to FIG. 1, but through a modified feeder device.
Figure 4:
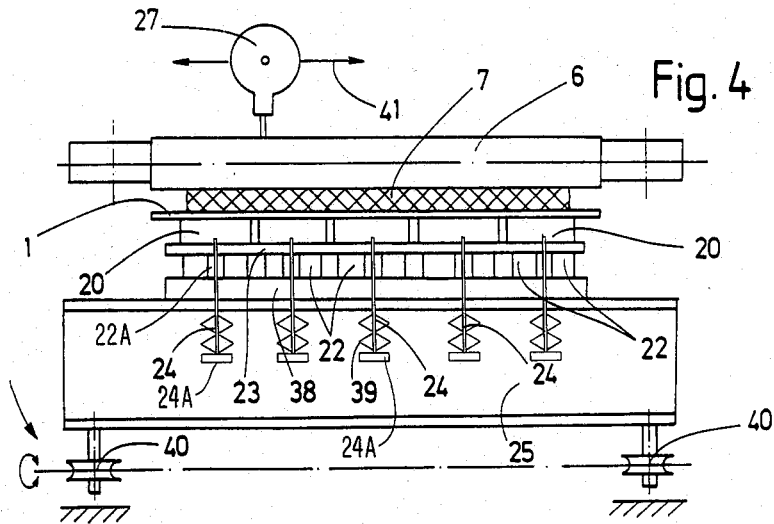
FIG. 4 is a cross-section through the device of FIG. 3 taken along the line IV—IV.

FIGS. 3 and 4 depict a modified embodiment, wherein the draw-in roll 6 is not provided with a adjusting roll. Rather, a series of five spaced-apart slide plates 20 are arranged in abutting relationship with the underside of the belt 1. The five slide plates 20 shown in the example of the embodiment are spaced apart in a direction parallel to the width of the belt 1 and are mounted on an elastic support plate 23. Below the plate 23 a row of wedges 22 is arranged, against which the support plate 23 is drawn by means of a plurality of draw bolts 24 distributed uniformly over the width of the support plate 23. The wedges rest on a wedge surface 38, which, in turn, is supported on a support body 25 in the form of a hollow girder. The draw bolts 24 extend in a freely movable manner through the support body 25 and through recesses 22A in the wedges and are connected fixedly to the support plate 23. Under the top wall of the support body 25, compression springs, for example plate springs 39, abut against the heads 24A of the draw bolts 24, so that the draw bolts are always biased downwardly at a predetermined force. The support plate 23 is being drawn downward, in this manner, in the direction of the support body 25. Depending on how the wedges 24 are arranged on the counter surface 38, it is possible to achieve an inclination or curvature of the support plate relative to the lateral width of the conveyor so that the slide plates 20 bear against the conveyor belt 1 at different heights relative to the support body 25. The surface of the support plate 23 may therefore occupy a position other than parallel to the support body 25. This makes it possible to compensate for factors which would otherwise produce differences in thickness of the deposited granule layer along the width of the conveyor. Thus, the depositing of a layer of uniform thickness can be more easily achieved.

An adjusting device 26 comprising, for example screw drives 40, is associated with the support body 25 permitting an adjustment in height of the entire support body 25 parallel to itself. This adjusting device 26 may be combined, as indicated in FIG. 3, with a measuring instrument 27 arranged to move back and forth in the direction of the arrow 41 transversely to the direction 10 while continuously measuring the unit weight of the layer 7 of the granules on the conveyor belt 1. By means of a transformer 42 and a drive 43 controlled by it, the test results may be evaluated and transformed into an automatic resetting of the support body 25, in order to obtain a uniform layer thickness. It would also be conceivable to evaluate the differential layer thickness measured over the width of the conveyor belt and to provide a corresponding adjustment of the wedges 22. The measuring instrument 27 is conventional and manufactured by Endress & Hauser GmbH & Co. Mersund Reglungstedinik.

Figure 5:
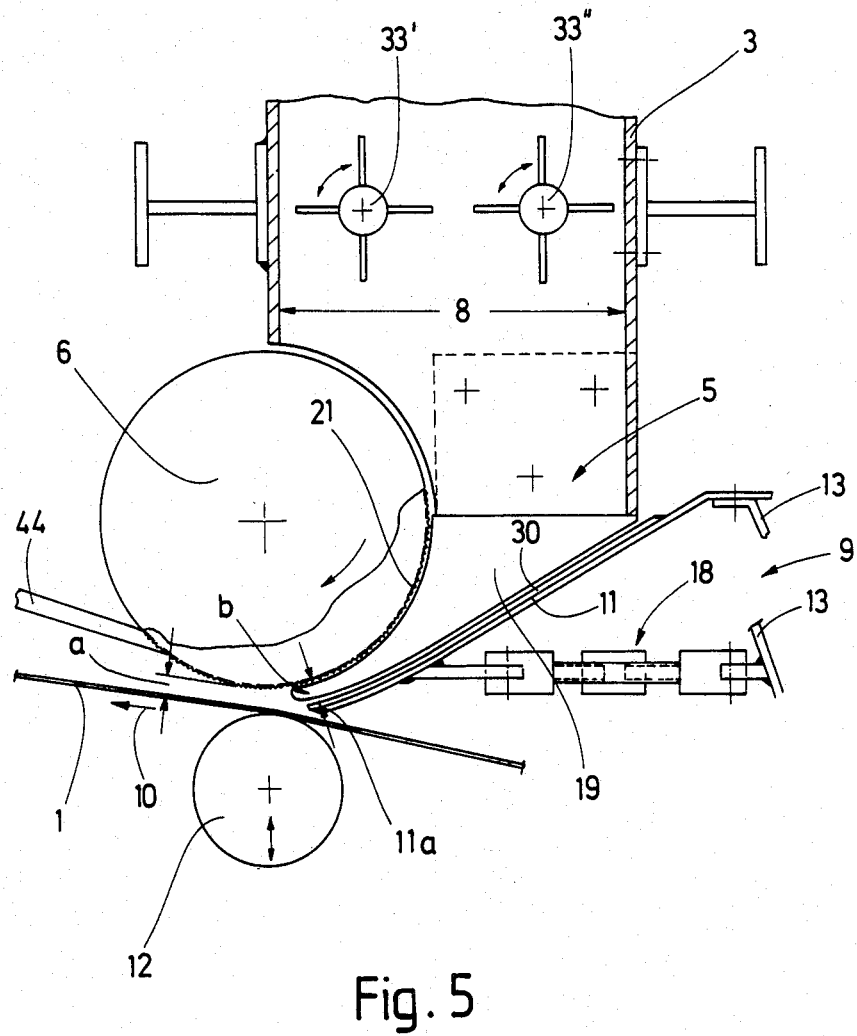
FIG. 5 is a detailed view of the draw-in zone of a feeder device similar to FIG. 1, but somewhat modified.

FIG. 5 depicts a further modification, whereby the finest possible adjustment of the introduction of the mixture of granules into the gap between the draw-in roll 6 and the conveyor belt 1 may be obtained. The feeder plate 11 is made of an elastically deformable material and provided with a coating 30 of an anti-friction material. The area located laterally of the guide plate 11 is closed-off under the funnel outlet opening 5 by means of side walls 19. In the funnel 3 itself, there are two agitator shafts 33′, 33″ instead of one. The support body 13 of the feed device 9 is equipped with a turnbuckle 18 connected to the guide plate 11 in the area of the free terminal edge 11a. The free end 11a of the guide plate 11 is curved sightly toward the direction of transport 10 of the belt 1. By adjusting the turnbuckle 18, the width of the gap b may be varied. This adjustment may be combined with the setting of the adjusting roll 12, so that the draw-in gap may be adapted to the type of granules being deposited.

The draw-in roll 6 is further equipped with a scraper 44, which scrapes-off the granules still adhering to the knurling 21 of the draw-in roll 6 and returns them to the granule layer on the steel belt 1. The functioning embodiment depicted in FIG. 5 corresponds to that disclosed in connection with FIGS. 1 and 2.

Although the present invention has been described in connection with preferred embodiments thereof, it will be appreciated by those skilled in the art that modifications, additions, deletions, and substitutions not specifically described may be made without departing from the spirit and scope of the invention as defined by the appended claims.

What is claimed is:

1. Apparatus for the production of mat-like webs from a layer of granules which is to be subjected to pressure and temperature while carried on a conveyor, said apparatus comprising:
   a conveyor belt for receiving a layer of granules and conveying such layer in a direction o conveyance, and
   feeder means for depositing the layer of granules on said belt, comprising:
      a granule hopper having a downwardly facing outlet,
      a draw-in roll mounted for rotation about an axis oriented transversely relative to said direction of conveyance, said draw-in roll having a roughened peripheral surface and oriented beneath a portion of said outlet, said draw-in roll spaced above said belt to form therewith a first gap,
      a guide plate inclined relative to vertical and disposed beneath the remainder of said outlet and arranged opposite said draw-in roll such that granules from said hopper flow through a space formed between said draw-in roll and said guide plate, said draw-in roll rotating in a direction to promote such flow, said guide plate including a lower free edge disposed below said draw-in roll and spaced therefrom to form a second gap, said second gap disposed upstream from said first gap with reference to the direction of granule flow and being larger than said first gap to supply excess granules to said first gap, and
      oscillating means for oscillating said guide plate transversely relative to said direction of conveyance to facilitate a back-flow of excess granules away from said second gap.

2. Apparatus according to claim 1, wherein said oscillating means produces a first vibration having a relatively small amplitude and relatively high frequency upon which is superposed a second vibration of higher amplitude and lower frequency.

3. Apparatus according to claim 1 including means for adjusting the size of said second gap relative to said first gap.

4. Apparatus according to claim 1, wherein said guide plate forms an acute angle relative to vertical, which angle is smaller than the angle of repose of the granules.

5. Apparatus according to claim 1 including adjusting means for adjusting the size of said first gap relative to said second gap.

6. Apparatus according to claim 5, wherein said adjusting means comprises means disposed beneath said belt for moving said belt toward and away from said draw-in roll.

7. Apparatus according to claim 6, wherein said adjusting means comprises a vertically movable adjusting roll.

8. Apparatus according to claim 6, wherein said adjusting means comprises a plurality of plates spaced transversely beneath said belt.

9. Apparatus according to claim 8 including independently adjustable wedges disposed below said plates and spaced transversely to provide for individualized adjustment of said plates.

10. Apparatus according to claim 9 including a support upon which said wedges are situated, a bendable support plate disposed between said wedges and said plates, and draw bolt means extending between said support plate and said support for pulling said support plate against said wedges.

11. Apparatus according to claim 10 including means for adjusting the height of said support to vary the spacing thereof from said belt.

12. Apparatus according to claim 11 including measuring means for measuring the unit weight of the layer of granules downstream of said first gap, said measuring means connected to said height adjusting means to vary the height of said support in accordance with the unit weight measurements of the layer.

13. Apparatus according to claim 1, wherein said guide plate includes a granule-guiding surface which is smooth.

14. Apparatus according to claim 13, wherein said surface is defined by an anti-friction material.

15. Apparatus according to claim 1 including a rigid frame, said oscillating means comprising a framework movably suspended from said frame, said guide plate carried by said frame, and an occillator mounted on said frame.

16. Apparatus according to claim 15, wherein said framework is of box-like shape, having lateral side walls, and springs suspending said framework from said rigid frame.

17. Apparatus according to claim 16, wherein said springs comprise plates mounted between said frame and framework such that plnnes defined by said plates are oriented parallel to said direction of conveyance.

18. Apparatus according to claim 17, wherein there are two said spring plates disposed vertically at each lateral end of said framework, and an additional plate spring disposed diagonally at each said lateral end.

19. Apparatus according to claim 18 including an adjusting device interconnecting said framework and said frame for adjusting said guide plate toward and away from said draw-in roll.

20. Apparatus according to claim 18 including lateral walls disposed at lateral ends of said space between said draw-in roll and said guide plate to laterally confine the granules.

21. Apparatus according to claim 20, wherein said guide plate is formed of an elastically deformable material.

22. Apparatus according to claim 21, wherein said outer periphery of said drawn-in roll is knurled.

23. Apparatus according to claim 22, wherein the knurling extends parallel to the axis of rotation of said draw-in roll.

* * * * *